United States Patent
Larraza et al.

(10) Patent No.: US 9,822,786 B1
(45) Date of Patent: *Nov. 21, 2017

(54) LIGHT ACTIVATED ROTOR

(71) Applicant: The United States of America, as represented by the Secretary of the Navy, Washington, DC (US)

(72) Inventors: Andres Larraza, Salinas, CA (US); David M. Wolfe, Texarkana, TX (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/093,047

(22) Filed: Apr. 7, 2016

Related U.S. Application Data (60) Provisional application No. 62/311,704, filed on Mar. 22, 2016.

(51) Int. Cl.
| | |
|---|---|
| *F03G 6/00* | (2006.01) |
| *F03G 7/00* | (2006.01) |
| *F04D 29/02* | (2006.01) |
| *F04D 29/053* | (2006.01) |
| *F04D 29/32* | (2006.01) |
| *F04D 29/38* | (2006.01) |

(52) U.S. Cl.
CPC ............. *F04D 29/023* (2013.01); *F03G 6/00* (2013.01); *F03G 7/00* (2013.01); *F04D 29/053* (2013.01); *F04D 29/329* (2013.01); *F04D 29/388* (2013.01)

(58) Field of Classification Search
CPC .... F03G 6/00; F03G 7/00; H02K 7/18; H02K 7/1807; H02K 7/1853
See application file for complete search history.

(56) References Cited

U.S. PATENT DOCUMENTS

| | | |
|---|---|---|
| 4,397,150 A | 8/1983 | Paller |
| 4,410,805 A | 10/1983 | Berley |
| 5,611,208 A | 3/1997 | Hemmerich et al. |

(Continued)

OTHER PUBLICATIONS

ThermoWorks, "Emissivity Table," retrieved Jul. 11, 2017.*

(Continued)

*Primary Examiner* — Audrey K Bradley
(74) *Attorney, Agent, or Firm* — Naval Postgraduate School; James B. Potts (57) ABSTRACT

Provided is a light activated rotor comprising typically a plurality of vanes affixed to a hub rotatable around the longitudinal axis of an axle. Each vane comprises a planar surface oriented generally perpendicular to the longitudinal axis of the axle with each vane separated into a first surface and a second surface. The first and second surface are adjacent and share a common boundary generally perpendicular to the longitudinal axis of the axle. Additionally, the first and second surfaces have differing emissivities. When the light activated rotor is illuminated with a radiant flux, the differing emissivities of the first and second surfaces produce a temperature gradient across the vane and generally perpendicular to the longitudinal axis, and a thermal creep force across the planar surface of the vane generates a revolution of the vane and the affixed hub around the longitudinal axis of the axle.

15 Claims, 3 Drawing Sheets

(56) References Cited

U.S. PATENT DOCUMENTS 5,871,336 A 2/1999 Young
8,235,675 B2 8/2012 Gianchandani et al.

OTHER PUBLICATIONS

Scandurra et al., "Gas kinetic forces on thin plates in the presence of thermal gradients," Physical Review E 75(2) (2007).
Chen et al., "The dynamic mechanism of a moving Crookes radiometer," Phys. Fluids 24 (2012).
Seldon et al., "Experimental and Computational Study of Area and Perimeter Contributions to Radiometer Forces," School of Aeronautics and Astronautics Faculty Publications. Paper 20. http://dx.doi.org/10.1063/1.3076616 (accessed Apr. 1, 2016).
Shida et al., "Maxwell's Thermal Creep in Two Space Dimensions," Journal of the Physical Society of Japan, 67(7) (1998).
Wadsworth et al., "A Computational Study of Radiometric Phenomena for Powering Microactuators with Unlimited Displacements and Large Available Forces," Journal of Microelectromechanical Systems, 5(1) (1996).
Alexeenko et al, "Low Speed Nano/Micro/Meso-Scale Rarefied Flows Driven by Temperature and Pressure Gradients," Rarified Gas Dynamics, pp. 1085-1092 (2007).
Scandurra, "Enhanced Radiometric Forces," http://arXiv:physics/0402011 [physics.class-ph] (accessed Apr. 1, 2016).
Wolfe et al., "A horizontal vane radiometer: Experiment, theory,and simulation,"Physics of Fluids 28 (2016).

* cited by examiner

LIGHT ACTIVATED ROTOR

RELATION TO OTHER APPLICATIONS

This patent application claims priority from provisional patent application 62/311,704 filed Mar. 22, 2016, which is hereby incorporated by reference in its entirety.

FIELD OF THE INVENTION

One or more embodiments relates to a light activated rotor for the generation of rotary motion using a plurality of vanes having adjacent higher and lower emissivity surfaces, where the higher and lower emissivity surfaces are generally co-planer with each other and co-planer with a plane of rotation.

BACKGROUND

Thermal transpiration or thermal creep refers to the thermal force on a gas due to a temperature difference. Thermal transpiration generates a flow of gas in the absence of pressure differences, and maintains a certain pressure difference in a steady state. In most applications, the effect is strongest when the mean free path of the gas molecules is comparable to the dimensions of a container or device.

A well-known device which relies on thermal transpiration is Crookes' Radiometer, also known as a light mill. Generally the light mill is a small chamber containing typically four or more vanes mounted symmetrically around a vertically-oriented axle, with opposing sides of each vane generally parallel to the axle. The parallel sides of the vanes are configured as a high emissivity surface on one side and a lower emissivity surface on an opposite side. When intense light impinges on the vessel, the temperature of the higher emissivity side becomes greater than the lower emissivity side, and the temperature difference generates a force directed toward the colder surface as air molecules contained in the vessel strike on the vanes. See e.g., Scandurra et al., "Gas kinetic forces on thin plates in the presence of thermal gradients," *Physical Review E* 75(2) (2007), among others. At low pressure the exerted forces are generally proportional to the temperature gradient on the vane, as well as the mean free path of gas molecules, the density of the gas, cross section of the molecules, and other factors, and the exact mechanism is a complex problem of kinetic theory of gases. In light mills where the differing emissivity surfaces occupy opposing sides of the vane, a thermal flow of molecules occurs from the cold to the hot side of the vane, and the reaction to this streaming is a force directed opposite to the temperature gradient, in a direction generally normal to the hotter surface. The maximum effective thickness of this force is one the order of a mean free path length of the surrounding gas, and correspondingly light mills are typically constrained to rarified atmospheres. See, for example, U.S. Pat. No. 4,410,805 issued to Berley, issued Oct. 18, 1983, and U.S. Pat. No. 4,397,150 issued to Paller, issued Aug. 9, 1983, among others. Additionally, in light mills where the responsible surfaces are essentially normal to a direction of intended rotation, the light absorbing surfaces present themselves as significant blunt drag objects in the surrounding atmosphere, which tends to impede motion as surrounding pressure is increased.

Thermal transpiration has also been employed to address challenges inherent to miniaturized moving parts, such as micropumps. See e.g. U.S. Pat. No. 5,871,336 issued to Young, issued Feb. 16, 1999, and see U.S. Pat. No. 8,235,675 issued to Gianchandani et al., issued Aug. 7, 2012, and see U.S. Pat. No. 5,611,208 issued to Hemmerich et al., issued Mar. 18, 1997, among others. In these applications, thermal transpiration is employed in a narrow channel to sustain a non-zero longitudinal pressure gradient when subjected to a temperature bias, where the narrow channel has hydraulic diameter smaller than the mean free path of the gas molecules and the temperature gradient is generally parallel to the confining walls of the channel. One accepted physical mechanism which explains the phenomenon posits that an asymmetric momentum transfer between the gas molecules and the channel walls is primarily responsible, since gas molecules from hot areas have a higher average velocity compared to the molecules from the cold side. In Knudsen-type pumps, this asymmetry results in an effective momentum transfer to the channel walls in the direction opposite to the temperature gradient. Although the wall is stationary, this does generate a force parallel to the channel surface, as opposed to generating forces normal to the surface as occurs in the light mills employing vertically mounted vanes.

It would be advantageous to provide a light activated rotor which generates thermal creep and corresponding momentum transfers parallel to a vane surface in order to generate rotary motion in response to a radiant flux such as light. Such a light activated rotor would be free of constraints closely tying vane thickness to mean free path lengths, and further would greatly mitigate the impact of light absorbing surfaces acting as blunt force drag objects tending to impede the generated rotary motion. Additionally, such as device would be more amenable to miniaturization allowing potential operation at normal atmospheric pressures.

These and other objects, aspects, and advantages of the present disclosure will become better understood with reference to the accompanying description and claims.

SUMMARY

The disclosure provides a light activated rotor comprising typically a plurality of vanes affixed to a hub rotatable around the longitudinal axis of an axle. Each vane generally comprises a planar surface oriented generally perpendicular to the longitudinal axis of the axle, with the planer surface divided into a first surface of higher emissivity and a second surface of lower emissivity. The respective surfaces are adjacent and share a common boundary generally perpendicular to the longitudinal axis of the axle. The common boundary for this purpose allows close enough proximity between the first surface and the second surface to create a continuous temperature gradient in the surrounding gas, i.e. a proximity no greater than 10 mean free paths between the two surfaces. In another embodiment no greater than 5 mean free paths, and in still another embodiment no greater than 1 mean free path. The common boundary may be a common border between the first and second surfaces, may comprise an intervening material between the first and second surfaces, or may comprise a physical gap between the first and second surfaces. When a radiant flux such as light simultaneously impinges the adjacent high emissivity and low emissivity surfaces, the differing emissivities produce a temperature gradient across the vane, generally parallel to the vane surfaces, and generally perpendicular to the longitudinal axis. This generates a thermal creep force across the planar surface of the vane in a direction from the high emissivity surface to the low emissivity surface, and generates a revolution of the vane and the affixed hub around the longitudinal axis of the axle.

The light activated rotor generally comprises an axle having a longitudinal axis and fixably attached to a foundation, a hub surrounding the axle and rotatable about the longitudinal axis, and at least one vane coupled to the hub. The vane itself comprises a first section and first surface and a second section and second surface. The first surface has a first emissivity and the second surface has a second emissivity, where the second emissivity is less than the first emissivity. The first and second surfaces additionally have a common boundary and are co-planer over the common boundary. Additionally, a reference plane is parallel with the second surface and the first surface over the portion of the common boundary and an acute angle between the longitudinal axis of the axle and a normal vector of the reference plane is less than 45 degrees, preferably less than 30 degrees, more preferably less than 15 degrees. The first section and the second section are additionally in thermal conductive communication through an area at the portion of the common boundary.

A method for generating rotary motion using a radiant flux is additionally disclosed comprising surrounding a vane with a gaseous atmosphere, where the vane is coupled to a hub surrounding and rotatable around an axle having a longitudinal axis, where the vane comprises a first surface and a second surface having characteristics as earlier described. The method further comprises a radiant flux toward the first surface and second surface of the vane and generating a first temperature on the first surface and a second temperature on the second surface. The method further comprises generating a thermal creep force from the first surface to the second surface using the temperature gradient and the gaseous atmosphere surrounding the vane, and generating rotary motion of the vane and the hub around the axle using the thermal creep force, thereby generating rotary motion using a radiant flux.

The novel apparatus and principles of operation are further discussed in the following description.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a light activated rotor for the production of rotary motion activated by an incident radiant flux.

The disclosure provides a light activated rotor comprising typically a plurality of vanes affixed to a hub rotatable around the longitudinal axis of an axle. Each vane comprises a planar surface oriented generally perpendicular to the longitudinal axis of the axle. Additionally, the planar surface of typically each vane is separated into a first surface and a second surface, where the first surface and the second surface are adjacent and share a common boundary, and where the common boundary is generally perpendicular to the longitudinal axis of the axle. The common boundary for this purpose allows close enough proximity between the first surface and the second surface to create a continuous temperature gradient in a surrounding gas, i.e. a proximity no greater than 10 mean free paths between the two surfaces. In another embodiment no greater than 5 mean free paths, and in still another embodiment no greater than 1 mean free path. The common boundary may be a common border between the first and second surfaces, may comprise an intervening material between the first and second surfaces, or may comprise a physical gap between the first and second surfaces. Further and significantly, the generally co-planer first and second surfaces have differing emissivities. When light activated rotor disclosed is illuminated with a radiant flux such as light, the differing emissivities of the first and second surfaces produce a temperature gradient across the vane and generally perpendicular to the longitudinal axis, and the temperature gradient in concert with an atmosphere around the light activated rotor generate a thermal creep force across the planar surface of the vane in a direction from the first surface to the adjacent second surface. The thermal creep force generates a revolution of the vane and the affixed hub around the longitudinal axis of the axle. The adjacent arrangement of the first and second surface and the substantially perpendicular orientations with respect to the longitudinal axis of the axle greatly mitigates the strict requirement limiting generated thermal creep to surrounding pressures in which mean free path lengths are large with respect to the geometrical dimensions of an apparatus, as opposed to radiometric devices which rely on differing emissivity surfaces which face toward opposing directions and generate forces normal to the surface faces. Additionally, in certain embodiments, a width W of the vane generally within the plane of rotation of the vane is at least 5 times greater than a height of the vane normal to the plane of rotation, in order to mitigate blunt drag forces as revolution occurs. In other embodiments, the width W is less than about 100 μm and the light activated rotor is surrounded by air at a pressure of at least 80 kPa.

Figure 1:
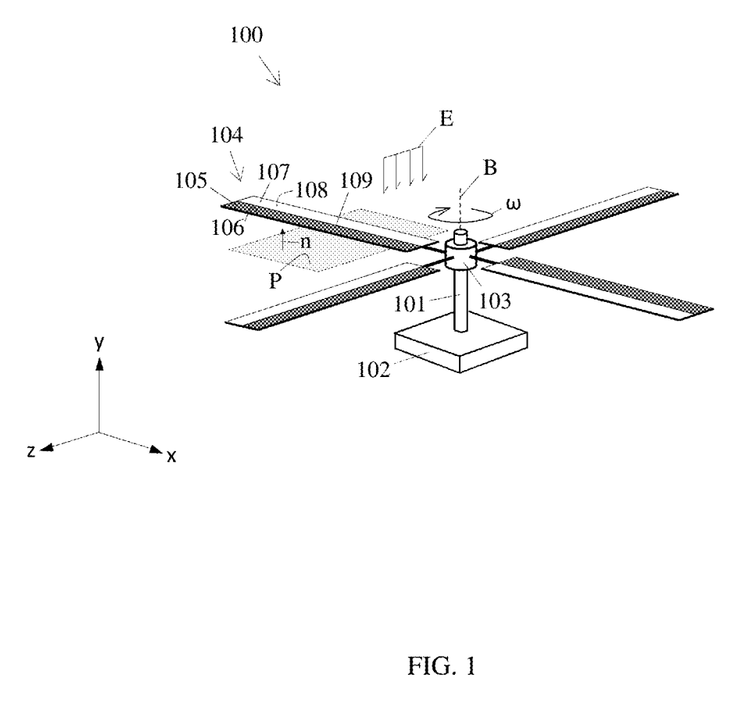
FIG. 1 illustrates an embodiment of a light activated rotor.

FIG. 1 illustrates an embodiment of an activated rotor generally indicated at 100. Activated rotor 100 comprises an axle 101 having a longitudinal axis B and typically fixably attached to foundation 102, and further comprises a hub 103 surrounding axle 102 and rotatable about longitudinal axis B. Activated rotor 100 additionally comprises a vane generally indicated 104 which is coupled to hub 103. Typically light activated rotor 100 comprises a plurality of vanes, as illustrated, and vane 104 is coupled to hub 103 in a manner such that a revolution of vane 104 around longitudinal axis B generates corresponding rotation of hub 103 around longitudinal axis B. For example, vane 104 may be fixably attached to hub 103.

Vane 104 comprises a first section 105 comprising first surface 106 and a second section 107 comprising second surface 108. Additionally, first surface 106 and second surface 108 are adjacent and have a common boundary 109, where typically at least a portion of common boundary 109 is coplanar with the longitudinal axis B of axle 101, and first surface 106 and second surface 108 are coplanar over the portion of common boundary 109 coplanar with longitudinal axis B. Further, first section 105 and second section 107 are generally oriented such that a normal vector n to a reference plane P has an acute angle with longitudinal axis B of less than 45 degrees, when the reference plane P is parallel to first surface 106 and second surface 108 over the portion of the common boundary 109. In an embodiment, the acute angle is less than 30 degrees, and in another embodiment less than 15 degrees. Typically, vane 104, first surface 106, second surface 108, and common boundary 109 are substantially perpendicular to longitudinal axis B as illustrated at FIG. 1, where longitudinal axis B is parallel to the y axis and the reference plane P is parallel to the x-z plane of the axes shown.

Additionally, at FIG. 1, first surfaces 106 and second surface 108 are surfaces of differing emissivity, with first surface 106 having a greater emissivity than second surface 108. As a result, if surfaces 106 and 108 are in thermal equilibrium with each other and a surrounding environment, and are then exposed to a radiant flux such as light E, the apparent temperature of the environment increases and first surface 106 and second surface 108 increase in temperature until they are again at equilibrium with the environment and each other, but the first surface 106, with greater emissivity, will initially increase in temperature more quickly. As a function of time then, the temperature difference between first surface 106 and second surface 108 will be substantially zero before being exposed to light E and increase to a maximum as first surface 106 heats up more quickly. Here, "radiant flux" means electromagnetic radiation emitted, reflected, transmitted or received, per unit time.

At FIG. 1, rotor 100 exploits the resulting and differing temperatures between first surface 106 and second surface 108 when exposed to a radiant flux such as light E in order to provoke thermal creep force acting from first surface 106 to second surface 108, and generate a rotation w of vane 108 and hub 103 around axle 101. Typically the total width of vane 108 (where width is along the z-axis of FIG. 1) is significantly greater than the height of vane 108 (where height is along the y-axis of FIG. 1), and correspondingly the thermal creep forces provoked by rotor 100 are generated substantially wholly within a plane of rotation parallel to the x-z plane, based on the orientation of first surface 106 and second surface 108 relative to axle 101. In a particular embodiment, the width of vane 104 is at least 5 times greater than the height of vane 104. In another embodiment, the width is at least 10 times greater. In typical embodiments, the height is less than the width. Rotor 100 thereby exploits the temperature gradient which arises across the adjacent first surface 106 and second surface 108 through differing emissivity when illuminated by light E in order to provide a thermal creep force generally parallel to the adjacent surfaces, and provides for revolution of vane 108 around axle 101 in a plane of rotation parallel to the coplanar surfaces 106 and 108. See Wolfe, et al., "A Horizontal Vane Radiometer: Experiment, Theory, and Simulation," *Phys. Fluids* 28, (2016). The adjacent arrangement of first surface 106 and second surface 108 and the substantially perpendicular orientations with respect to longitudinal axle B largely remove the strict requirement limiting generated thermal creep to surrounding pressures in which mean free path lengths are large with respect to the geometrical dimensions of an apparatus, as opposed to radiometric devices which rely on differing emissivity surfaces which face toward opposite directions. See, for example, U.S. Pat. No. 4,410,805 to Berley and U.S. Pat. No. 4,397,150 Paller, among others. In a particular embodiment where the light activated rotor is surrounded by an atmosphere, the total width of vane 108 is greater than three times the mean free path of the atmosphere. Mean free paths of a surrounding atmosphere may be determined using methods known in the art. See P. P. J. M. Schram, *Kinetic Theory of Gases and Plasmas* (1991), among others.

As discussed, common boundary 109 provides sufficient proximity between the first surface 106 and second surface 108 to create a continuous temperature gradient in a surrounding gas. In a particular embodiment, common boundary 109 has a width dimension $W_B$ perpendicular to longitudinal axis B, and $W_B$ is less than or equal to 10 mean free paths of a surrounding atmosphere. In another embodiment, width dimension $W_B$ of common boundary 109 is less than or equal to 5 mean free paths, and in another embodiment, less than or equal to 1 mean free path. The common boundary may be a common border between the first and second surfaces, may comprise an intervening material between the first and second surfaces, or may comprise a physical gap between the first and second surfaces such as an air gap. In the configurations provided in this disclosure, the thermal creep force is a function of the thermal creep shear pressure and the area over which that pressure acts, and the thermal creep shear pressure is a function of the temperature difference between the two surfaces. Correspondingly, in some embodiments common boundary 109 comprises an insulating material to mitigate temperature equalization between the first and second sections while still providing for thermal creep force from the first surface to the second surface. When common boundary 109 comprises some insulating material, it may be advantageous to provide a $W_B$ of about 10 mean free paths to allow thermal creep forces to act on the insulator surface while also providing for increased insulation by the insulator. With a solid insulator, increasing the width typically increases the temperature difference and therefore the thermal creep shear pressure without decreasing the area over which the pressure can act. In contrast, with an air gap, increasing the gap decreases the area over which the thermal creep shear pressure can act. In such cases, it may be advantageous to provide a $W_B$ of about 1 mean free path.

Figure 2A:
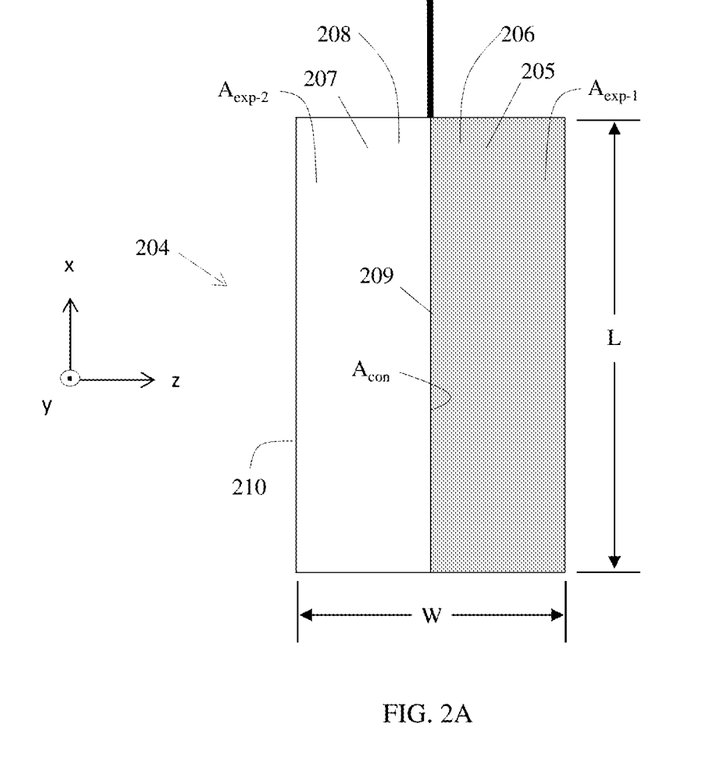
FIG. 2A illustrates a first view of an embodiment of a light activated rotor.
Figure 2B:
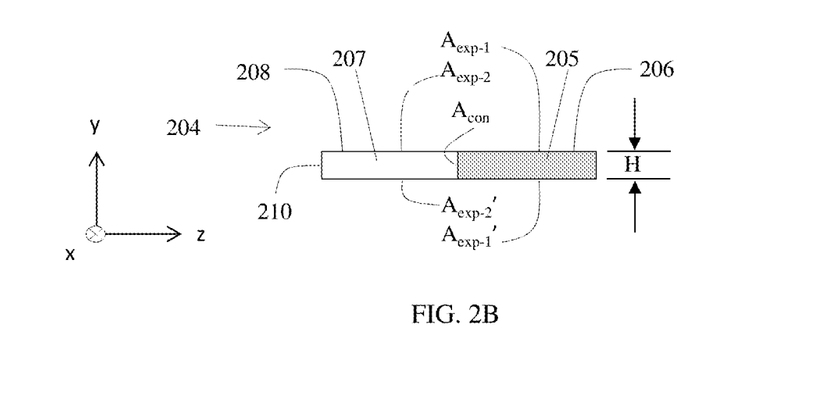
FIG. 2B illustrates a second view of the embodiment of the light activated rotor.

Vane 104 is further illustrated as vane 204 at FIGS. 2A and 2B, with orientation in accordance with the axes shown. Vane 204 comprises first section 205 comprising first surface 206 and a second section 207 comprising second surface 208, where first surface 206 and second surface 208 have a common boundary 209. As before, vane 204 is coupled to a hub (not shown) surrounding an axle (not shown), and substantially perpendicular to a longitudinal axis generally parallel to the y axis illustrated. At least some portion of common boundary 209 is coplanar with the longitudinal axis, and first surface 206 and second surface 208 are coplanar over the portion of common boundary 109 coplanar with the longitudinal axis. Additionally at FIGS. 2A and 2B. vane 204 has dimensions comprising a width W, height H, and length L. For illustration, the width W is parallel to the z-axis, the height H is parallel to the y-axis, and the length L is parallel to the x-axis. Further, first section 205 and second section 207 are generally in thermal conductive communication over an area $A_{con}$, where common boundary 209 comprises at least some portion of the area $A_{con}$. Here, "thermal conductive communication" means that first section 205 and second section 207 are in sufficient proximity such that conductive heat transfer may occur between first section 205 and second section 207 through the area $A_{con}$. In an embodiment, when first section 205 comprises a surface having a first temperature and second section 207 comprises a surface having a second temperature less than the first temperature, and first section 205 and second section 207 are in thermal conductive communication, conductive heat flow occurs from first section 205 to second section 207 through the area $A_{con}$ and through a portion of common boundary 209 comprising the area $A_{con}$. Additionally, an area $A_{exp-1}$ is equal to the surface area of first section 205 exposed to radiant flux and an area $A_{exp-2}$ is equal to the surface area of second section 207 exposed to radiant flux. Generally at FIG. 1, $A_{con}$ has dimensions of W by H and $A_{exp-1}$ and $A_{exp-2}$ have dimensions of L by W/2, and $A_{exp-1}$ and $A_{exp-2}$ have areas substantially equivalent to first surface 206 and second surface 208 respectively. In a particular embodiment, first surface 206 and second surface 208 have dimensions such that a ratio $R_{AREA}$ is equal to the area of first surface 206 divided by the area of second surface 208, and $0.5 \leq R_{AREA} \leq 1.5$, preferably $0.7 \leq R_{AREA} \leq 1.3$, and more preferably $0.9 \leq R_{AREA} \leq 1.1$. At FIG. 2B, if vane 204 is illuminated by a radiant flux additionally impinging the opposing sides of vane 204, $A_{exp-1}$ and $A_{exp-2}$ further comprise areas $A_{exp-1}'$ and $A_{exp-2}'$ respectively.

Within this disclosure, when a first and second line is "parallel" or "substantially parallel," this means that a first direction vector is parallel to the first line and a second direction vector is parallel to the second line, and the angle between the first direction vector and the second direction vector is less than 15 degrees, preferably less than 10 degrees, more preferably less than 5 degrees, and more preferably less than 1 degree. Similarly, when a first line is "perpendicular" or "substantially perpendicular" to a second line or a geometric plane, this means that a first direction vector is parallel to the first line and a second direction vector is parallel to the second line or parallel to a line within the geometric plane, and the angle between the first direction vector and the second direction vector is at least 75 degrees, preferably at least 80 degrees, more preferably at least 85 degrees, and more preferably at least 1 degree. Similarly, when a first surface or plane and a second surface or plane are "co-planer" or "substantially co-planer" over some displacement X such as a portion of the common boundary, this means that over the distance X, the first line and the second line are in-plane with the reference plane to within 0.3×, more preferably to within 0.15× and more preferably with 0.05×. Further, when a surface is "parallel" or "substantially parallel" to a reference plane, this means a reference line intersects both the surface and the reference plane, and the reference line is substantially perpendicular to the surface and the reference plane.

As discussed, a particular advantage of light activated rotor 100 is the enablement of thermally driven rotation around axle 101 using a first and second surface generally perpendicular to longitudinal axis B, so that the first and second surfaces which receive a radiant flux can be largely confined to revolve around longitudinal axis B in a plane of rotation substantially perpendicular to longitudinal axis B. This allows the areas of a given vane intended to receive radiant flux to be largely a function of a length L and a width W, which are also generally confined to the plane of rotation. As a result, the height H of the vane which defines surfaces generally normal to the direction of rotation can be significantly less than either L or W, so that drag forces acting on a surface such as 210 and substantially perpendicular to a rotation ω at FIG. 1 may be mitigated, and the dampening effect of these particular drag forces on rotations may be minimized as the areas of surfaces 206 and 208 intended to receive radiant flux and generate thermal creep are increased. Toward this end and in particular embodiment, the height H of vane 204 is less than 5 times the width W of vane 204. In another embodiment, the height H is less than 10 times the width W, and the drag on vane 204 as vane 204 rotates around longitudinal axis B within an atmosphere substantially comprises thin, flat plate drag. Here, "plane of rotation" means a surface of revolution described by the portion of the common boundary between the first and second surface as the vane and hub revolve around the longitudinal axis of the axle.

In further embodiment, at least 75%, 85%, or 95% of common boundary 109 separating first surface 106 and second surface 108 is coplanar with the longitudinal axis B of axle 101. In another embodiment, at least 75%, 85%, or 95% of first surface 106 and at least 75%, 85%, or 95% of second surface 108 is substantially parallel to the reference plane P.

Figure 3A:
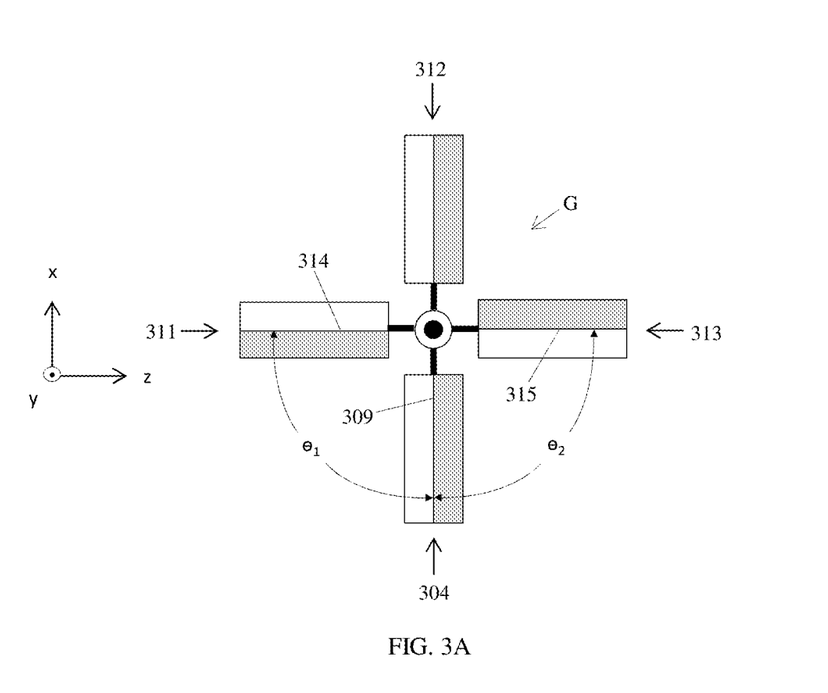
FIG. 3A illustrates a first view of an additional embodiment of a light activated rotor.
Figure 3B:
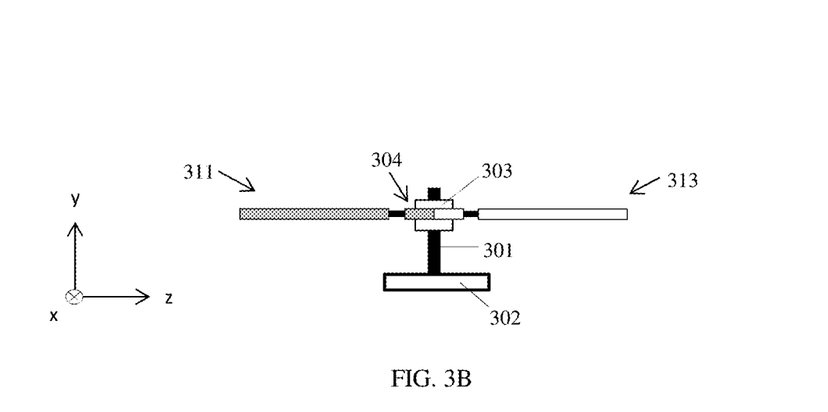
FIG. 3B illustrates a second view of the additional embodiment of the light activated rotor.

FIGS. 3A and 3B illustrate another embodiment of the light activated rotor where light activated rotor 300 comprises a plurality of vanes 304, 311, 312, and 313 coupled to hub 303. Hub 303 surrounds axle 301 with axle 301 fixably attached to a foundation 302. At FIG. 3A, each vane in the plurality of vanes is separated from every other vane by a gap G, such that a first surface of a first vane and a second surface of a second vane are not in contact over a distance of at least 75%, 85%, or 95% of the common boundary of either vane. In another embodiment, the plurality of vanes is arranged symmetrically, such that the common boundary of a given vane is separated from the common boundary of an adjacent vane by an angle θ, and each angle θ in the plurality is within 20 degrees of every other angle θ in the plurality. For example, at FIG. 3A, where angle $\theta_1$ extends between common boundary 309 of vane 304 and common boundary 314 of vane 311, and angle $\theta_2$ extends between common boundary 309 of vane 304 and common boundary 315 of vane 313, angle $\theta_1$ is within twenty degrees of angle $\theta_2$.

When activated by a radiant flux such as light, light activated rotor 200 generates a thermal creep force across vane 104 by virtue of a temperature gradient across first surface 106 and second surface 108, and based on an atmosphere surrounding light activated rotor 100. When the mean free path is larger than the typical length of the temperature gradient, the tangential stress on a surface in the yz plane due to a temperature gradient along the y-direction can be calculated to be:

$$p_{shear} = \frac{15 k_B \alpha}{64 \sqrt{2} \, \sigma_{CS}} \frac{dT}{dy}, \tag{1}$$

with $k_B$ Boltzmann's constant, a the accommodation coefficient of the plate, $\sigma_{CS} = \pi d^2$ the hard-sphere collision cross section of molecules with diameter d, and dT/dy the temperature gradient. See Scandurra et al., (2007). If all collisions are assumed to be either perfectly specular or perfectly diffuse, the accommodation coefficient is the fraction of diffuse collisions in a sample. The value of the accommodation coefficient thus ranges between zero and one. The thermal creep force, $F_{TC}$, is this pressure multiplied by the area over which it acts. Taking into account slip length corrections, this force is:

$$F_{TC} = \frac{15}{64 \sqrt{2}} \frac{k_B}{\sigma_{CS}} \Delta T \alpha L' \min\left(\frac{W_V}{W_{Ggas}}, 1\right), \tag{2}$$

where $W_V$ is the width of the vane, $$W_{Ggas} = W_{Gsurf} + 2\lambda \frac{2-\alpha}{\alpha}, \tag{3}$$

is the width of the temperature gradient in the gas, with $W_{Gsurf}$ the width of the temperature gradient on the surface of the vane, and $$L' = L - \frac{1}{2}\lambda \frac{2-\alpha}{\alpha}, \tag{4}$$

the correction to the vane's length L perpendicular to the temperature gradient. See Wolfe et al., "A Horizontal Vane Radiometer: Experiment, Theory, and Simulation," *Physics of Fluids*, 28(3) (2016).

The temperature difference ($\Delta T$) on vane 204 is a function of the thermal energy of first section 205 and second section 207. If $T_H$ is the temperature of a hot side for example first section 205, $T_C$ is the temperature of a cold side for example second section 207, C is a heat capacity substantially equivalent in both sections, $U_H$ is the thermal energy of the hot side, and $U_C$ is the thermal energy of the cold side, then $$\Delta T = T_H - T_C = \frac{1}{C}(U_H - U_C) \tag{5}$$

The temperature difference is a maximum when the time rates of change of the thermal energies of the two halves are equal.

$$\frac{\partial(\Delta T)}{\partial t} = 0 \rightarrow \frac{\partial U_H}{\partial t} = \frac{\partial U_C}{\partial t} \tag{6}$$

Generally for at least centimeter sizes dimensions of W, H, and L, the temperature difference on the vanes is not expected to vary with the pressure of a surrounding atmosphere, suggesting convective heat transfer between first section 205 and second section 207 is relatively negligible. The time rates of change of the thermal energies are thus functions of their respective net black body radiation and the thermal conduction rate between them, or $$\frac{\partial U_H}{\partial t} = \sigma_{SB}\varepsilon_H A_{exp}(T_{env}^4 - T_H^4) - k_t A_{con}\frac{\Delta T}{W_G}, \tag{7}$$

and $$\frac{\partial U_C}{\partial t} = \sigma_{SB}\varepsilon_C A_{exp}(T_{env}^4 - T_C^4) + k_t A_{con}\frac{\Delta T}{W_G}, \tag{8}$$

where $\sigma_{SB}$ is the Stephan-Boltzmann constant, $\varepsilon$ is the emissivity, $A_{exp}$ is the surface area $A_{exp-1}$ or $A_{exp-2}$ when first surface 206 and second surface 208 are substantially equivalent, $T_{env}$ is the apparent temperature of a surrounding environment, $k_t$ is a thermal conductivity between first section 205 and second section 207 through the area $A_{con}$, and $W_G$ is the width of a temperature gradient in the vane.

The temperature of the hot side of the vane can be rewritten as a function of the temperature of the cold side and the temperature difference.

$$T_H = T_C + \Delta T = T_C\left(1 + \frac{\Delta T}{T_C}\right). \tag{9}$$

Typically the temperature difference is much smaller than the temperature of the cold side of the vane allowing the approximation $$T_H^4 = T_C^4\left(1 + \frac{\Delta T}{T_C}\right)^4 \approx T_C^4 + 4T_C^3\Delta T \tag{10}$$

Substituting approximation (10) into equation (7) then setting equal to equation (8) and solving for the temperature difference provides an expression for the maximum temperature difference, $$\Delta T_{max} \approx \frac{\sigma_{SB}(\varepsilon_H - \varepsilon_C)A_{exp}(T_{env}^4 - T_C^4)}{4\sigma_{SB}\varepsilon_H A_{exp}T_C^3 + \frac{2k_t A_{con}}{W_G}} \tag{11}$$

The scaling behavior of this relation depends on which is the dominant term in the denominator. For the centimeter size vanes, the blackbody term is more than 10 times greater than the thermal conductivity term due to the relatively large area exposed and characteristic length of the temperature gradient, and relatively small thermal conductivity and contact area between the two halves. Thus, for centimeter-scale vanes with low thermal conductivity, $$\Delta T_{max} \approx \frac{(\varepsilon_H - \varepsilon_C)(T_{env}^4 - T_C^4)}{4\varepsilon_H T_C^3} \tag{12}$$

This expression also reflects that the magnitude of the temperature difference is not generally a function of the width of the vanes.

The blackbody term is a function of two linear dimensions ($A_{exp}$ or generally L times W) while the thermal conductivity term is a function of one linear dimension and an aspect ratio ($A_{con}/W_G$ or L times H divided by W). For micron-scale vanes then the thermal conductivity term is likely to dominate the denominator. The smaller dimensions will also result in the characteristic length of the temperature gradient being equal to the width of the vane. Assuming the top and bottom of the vane are both exposed to the light source, the maximum temperature difference on a MEMS vane becomes, $$\Delta T_{max} \approx \frac{\sigma_{SB}(\varepsilon_H - \varepsilon_C)W^2(T_{env}^4 - T_C^4)}{2k_t H}, \tag{13}$$

or $$\frac{\Delta T_{max}}{W} \propto \frac{W}{H}, \tag{14}$$

where W is the width of the vane and H is the height or thickness of the vane. The temperature gradient is thus a function of the aspect ratio of the width (which affects the net blackbody radiation) to the thickness (which affects the thermal conductivity). It is not a function of the length (which affects both). The temperature difference is simply the temperature gradient times the width of the vane.

Ignoring edge corrections for the purpose of developing a scaling relation, the thermal creep force is thus linearly proportional to the length and temperature difference of the vane, or $$F_{TC} \propto \Delta TL \quad (15)$$

Combining this result with relation (14) provides the following scaling relationship for the thermal creep force on a MEMS vane.

$$F_{TC} \propto \frac{W^2 L}{H} \quad (16)$$

In a particular embodiment, $\epsilon_H$ is an emissivity of first surface 206 and $\epsilon_C$ is an emissivity of second surface 208, and the width W of FIG. 2 is a dimension describing the portion of first surface 206 and second surface 208 adjacent to and perpendicular to common boundary 209, and an area $A_{exp}$ is equal to the larger of $A_{exp-1}$ of first surface 206 or $A_{exp-2}$ of second surface 208, and first section 205 and second section 207 are in thermal conductive communication through the area $A_{con}$ as before. Further, a length L is equal to $A_{exp}$ divided by W and a height H is equal to $A_{con}$ divided by W, and $k_t$ is as previously defined. In some embodiments, vane 204 has dimensions of L, H, and W and the property $k_t$ such that when vane 204 is surrounded by an atmosphere at the temperature $T_{env}$ such as 294 K, a $\Delta T_1$ is defined by eqn (12) and a $\Delta T_2$ is defined by eqn (13), and $\Delta T_1 / \Delta T_2 \leq 1$. In another embodiment, $\Delta T_1 / \Delta T_2 \leq 10$, and in a further embodiment $\Delta T_1 / \Delta T_2 \leq 100$. It is understood that the property $k_t$ is impacted by material selections for first section 205, second section 207, and common boundary 209 when common boundary 209 comprises an intervening material or gap, and may additionally be impacted by a thermal contact resistances, which may be determined using means known in the art. See e.g. C. V. Madhusudana, *Thermal Contact Conductance* (1995), among others.

In a particular embodiment, a total width of first surface 106 and second surface 108 is less than 100 μm (micron). In another embodiment, $(\epsilon_H - \epsilon_C) \geq 0.1$. First section 105 and second section 107 may be comprised of any materials which meet the specifications disclosed herein. Additionally, first section 105 and second section 107 may comprise individual unitary pieces supporting or comprising first surface 106 and second surface 108 respectively, or may be portions of a single substrate supporting or comprising first surface 106 and second surface 108, or may be individual substrates each supporting either first surface 106 or second surface 108, or any other configuration generating a vane comprising a first surface and second surface as disclosed.

The scaling relationships disclosed allow results from centimeter-scale rotors to be extended into the MEMS realm, and additionally indicate the effect of varying the aspect ratio of a light activated rotor. For example, shrinking the horizontal vanes while maintaining geometrical similarity (constant aspect ratios between the physical dimensions of the vanes) and increasing the pressure to its atmospheric value while maintaining a constant ratio between the physical dimensions of the vanes and the mean free path. The resulting temperature difference across the vane, the characteristic length of the temperature gradient on the vane, and the value of the pressure at which thermal creep was observed may be determined for a given vane. Based on the pressure of an atmosphere surrounding the device, the physical dimensions of the vanes can be defined as functions of the mean free path. Then, equation (2) can be used to calculate the force at the pressure where the width of the vane equals the characteristic length of the temperature gradient on the surface. Scaling relationships (14) and (16) can then be used to extend the result of that calculation to estimate the temperature difference and force on a MEMS device at atmospheric pressure. Finally, the aspect ratios in the device can be modified to achieve a desired force. For example, in a particular embodiment, 8 mm by 16 mm vanes generated a 9 K temperature difference. See Wolfe et al., (2016). The temperature gradient had a characteristic length of 3.5 mm and thermal creep was observed at 30 Pa. Thus, the width of the vane at this pressure is 35 mean free paths and the length is 70 mean free paths. The width of the vane equals the characteristic length of the temperature gradient when the vane is 3.5 mm by 7 mm and the mean free path is 0.1 mm. Using these values in equation (2) provides a force of 173 nN. Scaling relationships (14) and (16) then predict a 6 mK temperature difference and a 0.08 pN force on a 2.4 μm by 4.8 μm device at atmospheric pressure. If instead a force of 1 pN was desired, relation (16) indicates the length could be increased to 60 μm or width increased to 8.5 μm.

For the scaling relations to be meaningful, the important parameters to determine experimentally are the temperature difference across the vane, the characteristic length of the temperature gradient on the vane, and the value of the pressure at which thermal creep was observed. From the pressure reading, the physical dimensions of the vanes can be defined as functions of the mean free path. Then, equation (2) can be used to calculate the force at the pressure where the width of the vane equals the characteristic length of the temperature gradient on the surface. Scaling relationships (14) and (16) can then be used to extend the result of that calculation to estimate the temperature difference and force on a MEMS device at atmospheric pressure. Finally, the aspect ratios in the device can be modified to achieve a desired force.

In a particular embodiment, vane 104 of light activated rotor 100 is surrounded by an atmosphere such as a gaseous atmosphere and a radiant flux such as E impinges first surface 106 and second surface 108. In this embodiment, the radiant flux generates a first temperature on first surface 106 and a second temperature on second surface 108, where the first temperature is greater than the second temperature, and the first temperature and the second temperature generate a temperature gradient and a thermal creep force in a direction from first surface 106 to second surface 108, producing a revolution of vane 104 around longitudinal axis B of axle 101. In certain embodiments, the atmosphere surrounding vane 104 comprises air at a pressure of at least 80 kPa, and a total width W of vane 104 is less than 100 microns. In a further embodiment, the emissivity of first surface 106 is at least 0.8, and in another embodiment, the emissivity of second surface 108 is less than or equal to 0.6. In some embodiments, the disclosure provides a system for generating rotary motion comprising light activated rotor 100 as described, and comprising the gaseous atmosphere and rotary flux impinging vane 104, with resulting thermal creep force generating the revolution of vane 104 around longitudinal axis B of axle 101.

In a further embodiment, the disclosure provides a method for generating rotary motion using a radiant flux comprising: (i) surrounding a vane with a gaseous atmosphere, where the vane is coupled to a hub and the hub surrounding an rotatable around an axle having a longitudinal axis, and where the vane comprises a first surface and a second surface, where the first surface has a first emissivity and the second surface has a second emissivity where the second emissivity is less than the first emissivity, and where the second surface and the first surface have a common boundary where the second surface borders the first surface over a portion of the common boundary, and where the second surface is co-planer with the first surface over the portion of the common boundary, and where a reference plane is parallel to the second surface and the first surface over the portion of the common boundary and an acute angle between the longitudinal axis of the axle and a normal vector of the reference plane is less than 45 degrees; (ii) directing a radiant flux toward the first surface and the second surface of the vane; (iii) generating a first temperature on the first surface and a second temperature on the second surface using the radiant flux, where the first temperature is greater than the second temperature, thereby generating a temperature gradient across the vane; (iv) generating a thermal creep force from the first surface to the second surface using the temperature gradient and the gaseous atmosphere surrounding the vane; (v) generating rotary motion of the vane and the hub around the axle using the thermal creep force, thereby generating rotary motion using a radiant flux.

Thus, provided here is a light activated rotor comprising one or more vanes coupled to a hub, where the hub is rotatable around an axle, and where the vane comprises a first surface having a first emissivity and a second surface having a second emissivity, with the first emissivity greater than the second emissivity. The first surface and second surface of the vane are adjacent and generally in contact at a common boundary where the common boundary is generally perpendicular to a longitudinal axis of the axle. When the first and second surfaces are impinged by a radiant flux, the radiant flux develops a first temperature on the first surface and a second temperature on the second surface, with the first temperature greater than the second temperature. The temperature difference generates a temperature gradient across the vane resulting in a thermal creep force from the first surface to the second surface and generally within a plane of rotation of the vane around the axle, producing revolution of the vane and coupled hub around the axle. In certain embodiments, a width W of the vane generally within the plane of rotation of the vane is at least 5 times greater than a height of the vane normal to the plane of rotation, in order to mitigate blunt drag forces as revolution occurs. In other embodiments, the width W is less than about 100 μm and the light activated rotor is surrounded by air at a pressure of at least 80 kPa.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A light activated rotor comprising:
    an axle having a longitudinal axis and fixably attached to a foundation;
    a hub surrounding the axle and rotatable about the longitudinal axis; and
    a vane coupled to the hub where the vane comprises:
        a first section, where the first section comprises a first surface, and where the first surface has a first emissivity; and
        a second section, where the second section comprises a second surface, and where the second surface has a second emissivity where the second emissivity is less than the first emissivity, and where the second surface and the first surface have a common boundary, where the second surface borders the first surface over a portion of the common boundary, and where the second surface is co-planer with the first surface over the portion of the common boundary, and where a reference plane is parallel with the second surface and the first surface over the portion of the common boundary and an acute angle between the longitudinal axis of the axle and a normal vector of the reference plane is less than 45 degrees.

2. The light activated rotor of claim 1, where the first section and the second section are in thermal conductive communication through an area $A_{CON}$, where the portion of the common boundary comprises some portion of the area $A_{CON}$.

3. The light activated rotor of claim 2, where a total width W is equal to a first section width added to a second section width, where the first section width is a dimension of the first surface perpendicular to the portion of the common boundary and the second section width is a dimension of the second surface perpendicular to the portion of the common boundary, and where an area of the first surface added to an area of the second surface is equal to an area $A_{EXP}$, and a length L is equal to the area $A_{EXP}$ divided by the total width W, and where a height H is equal to the area $A_{CON}$ divided by the length L, and where the total width W is greater than 5 times the height H.

4. The light activated rotor of claim 3, where the total width W is greater than 10 times the height H.

5. The light activated rotor of claim 2, further comprising an atmosphere surrounding the vane and a radiant flux impinging the first surface and the second surface, and the radiant flux generating a first temperature on the first surface and a second temperature on the second surface, where the first temperature is greater than the second temperature, and the first temperature and the second temperature generating a temperature gradient and generating a thermal creep force in a direction from the first surface to the second surface, and the thermal creep force generating a revolution of the vane around the longitudinal axis of the axle.

6. The light activated rotor of claim 5, where the atmosphere surrounding the vane comprises air at a pressure of at least 80 kPa, and where a total width W is equal to a first section width added to a second section width, where the first section width is a dimension of the first surface perpendicular to the portion of the common boundary and the second section width is a dimension of the second surface perpendicular to the portion of the common boundary, and where the total width is less than 100 microns.

7. The light activated rotor of claim 6, where the first emissivity minus the second emissivity is equal to at least 0.1.

8. The light activated rotor of claim 2, where $\epsilon_H$ is the first emissivity and $\epsilon_C$ is the second emissivity, and where the first section has a first section width perpendicular to the portion of the common boundary and the second section has a second section width perpendicular to the portion of the common boundary, and where a total width W is equal to the first section width added to the second section width, and where an area of the first surface added to the area of the second surface is equal to an area $A_{EXP}$ and a length L is equal to the area $A_{EXP}$ divided by the total width W, and where a height H is equal to the area $A_{CON}$ divided by the length L, and where $k_t$ is a thermal conductivity between the first section and the second section at the area $A_{CON}$ and $\sigma_{SB}$ is the Stephan-Boltzmann constant, and where a $\Delta T_1$ and a $\Delta T_2$ are defined by the expressions $$\Delta T_1 = \frac{(\varepsilon_H - \varepsilon_C)(T_{ENV}^4 - T_C^4)}{4\varepsilon_H T_C^3}$$

and $$\Delta T_2 = \frac{\sigma_{SB}(\varepsilon_H - \varepsilon_C)W^2(T_{ENV}^4 - T_C^4)}{2k_t H}$$

where $T_c$ is a minimum temperature of the second section when the first section and the second section are illuminated by a radiant flux and $T_{ENV}$ is a temperature of an atmosphere surrounding the vane and equal to 294 K, and where the $\Delta T_1$ divided by the $\Delta T_2$ is less than or equal to 100 when the first surface and the second surface are illuminated by the radiant flux.

9. A system for generating rotary motion comprising:
a light activated rotor, where the light activated rotor comprises:
an axle having a longitudinal axis and fixably attached to a foundation;
a hub surrounding the axle and rotatable about the longitudinal axis; and
a vane coupled to the hub where the vane has a length L, a width W, and a height H, where the length L is perpendicular to the longitudinal axis of the axle, the width W is perpendicular to the length L, and the height H is perpendicular to the length L and the width W, and where the vane comprises a planar surface perpendicular to the longitudinal axis and having an area equal to the length L multiplied by the width W, and where a boundary parallel to the length L separates a first surface of the planar surface and a second surface of the planar surface, where the first surface of the planar surface has a first emissivity and the second surface of the planar surface has a second emissivity, where the second emissivity is less than the first emissivity;
an atmosphere surrounding the light activated rotor; and
a radiant flux impinging the first surface and the second surface of the planar surface, and the radiant flux generating a first temperature on the first surface and a second temperature on the second surface, where the first temperature is greater than the second temperature, and the first temperature and the second temperature generating a temperature gradient and generating a thermal creep force in a direction from the first surface to the second surface, and the thermal creep force generating a revolution of the vane and the hub around the longitudinal axis of the axle, and thereby generating rotary motion of the vane around the longitudinal axis of the axle.

10. The system of claim 9, where the width W is greater than the height H.

11. The system of claim 10, where the atmosphere surrounding the light activated rotor has a mean free path and where the width W is greater than three times the mean free path of the atmosphere surrounding the light activated rotor.

12. The system of claim 11, where the rotary motion of the vane generates a plane of rotation and the plane of rotation is perpendicular to the longitudinal axis of the axle.

13. The system of claim 12, where the width W is less than 100 microns and where the atmosphere surrounding the vane comprises air at a pressure of at least 80 kPa.

14. The system of claim 13, where the first emissivity minus the second emissivity is equal to at least 0.1.

15. A method of generating rotary motion using a radiant flux comprising:
surrounding a vane with a gaseous atmosphere, where the vane is coupled to a hub and the hub surrounds and is rotatable around an axle having a longitudinal axis, and where the vane comprises a first surface and a second surface, where the first surface has a first emissivity and the second surface has a second emissivity where the second emissivity is less than the first emissivity, and where the second surface and the first surface have a common boundary where the second surface borders the first surface over a portion of the common boundary, and where the second surface is co-planer with the first surface over the portion of the common boundary, and where a reference plane is parallel to the second surface and the first surface over the portion of the common boundary and an acute angle between the longitudinal axis of the axle and a normal vector of the reference plane is less than 45 degrees;
directing the radiant flux toward the first surface and the second surface of the vane;
generating a first temperature on the first surface and a second temperature on the second surface using the radiant flux, where the first temperature is greater than the second temperature, thereby generating a temperature gradient across the vane;
establishing a thermal creep force from the first surface to the second surface using the temperature gradient and the gaseous atmosphere surrounding the vane; and
generating rotary motion of the vane and the hub around the axle using the thermal creep force, thereby generating rotary motion using the radiant flux.

\* \* \* \* \*